United States Patent Office 3,450,608
Patented June 17, 1969

3,450,608
PURIFICATION OF ETHERS
Richard L. Craig, Lake Jackson, Tex., assignor to Nalco Chemical Company, Chicago, Ill., a corporation of Delaware
No Drawing. Filed Mar. 9, 1966, Ser. No. 532,843
Int. Cl. C07f 7/24; B01k 1/00; B01d 3/34
U.S. Cl. 204—59                 9 Claims

ABSTRACT OF THE DISCLOSURE

Ether compounds of the type used in the electrolysis of Grignard reagents are purified by treating such impure ethers containing lower alcohols as the impurity with sulfamic acid to form reaction products of said alcohol and acid. The reaction products are separated from the ether compounds prior to electrolysis.

---

The present invention relates to a method of purifying ether compounds. More specifically, the instant invention relates to a method of purifying ethers used as solvents for Grignard reagents in electrolytes which are electrolyzed using a lead anode to produce organic lead compounds.

The manufacture of organo metallic compounds and, more specifically, organic lead compounds, by electrolyzing an anhydrous solution of a Grignard reagent in an organic solvent for the Grignard reagent is disclosed in U.S. Patents 3,007,857 and 3,007,858. In the process disclosed in the latter patent, an extraneous organic halide is added to the electrolyte. It is preferred that ether solvents be employed during the electrolysis of the processes exemplified above. For example, it has been proposed that a combination of heterocyclic ethers such as tetrahydrofuran and polyglycol ethers be utilized as solvating agents in this type of synthesis of organo lead compounds. To achieve an efficient continuous process, it is imperative that the ether solvents be recovered and recirculated back to the electrolysis cells.

However, in carrying out the various steps necessary to effect ether recovery such as separation by heat distillation, it has been determined that these ether solvents sometimes decompose to give by-products which are preferentially soluble in the ether stream. For example, in recovering the tetrahydrofuran as well as the other ether or ethers employed by means of separation from lead products and inorganic brine by-products, the tetrahydrofuran is distilled or steam-stripped from the entire reaction mass. Other purification steps are also necessary to dry the tetrahydrofuran prior to its reuse as electrolyte solvent. It has been discovered that this ether tends to break down somewhat during processing to produce active hydrogen impurities such as lower alcohols. These alcohols are carried along with the tetrahydrofuran through the various purification steps and would therefore be introduced back into the electrolysis cell without further treatment of some type. It is undesirable to introduce these alcohol impurities into the electrolyte since they are readily reactive with the Grignard reagent and would cause loss of magnesium and organic halide materials. This would have the effect of increasing the overall cost and reducing the efficiency of the process.

As examples of active hydrogen impurities present, analysis of tetrahydrofuran ether after various purification steps have been effected shows that a number of lower alcohols are present such as methyl alcohol, ethyl alcohol and 2-butenyl alcohol.

It is therefore an object of the present invention to provide a new and improved process for removing active hydrogen impurities, such as alcohol impurities, from ethers such as tetrahydrofuran prior to introducing these ethers back into the electrolysis cells.

Another object of the invention is to carry out the above process without otherwise adversely affecting the utility of ethers as solvents for Grignard reagents in electrolytes employed in an electrolysis system for making organic lead compounds, using a lead anode.

A further object of the invention is to provide a process for purifying organic ethers for removal of active hydrogen compounds such as alcohols, which process can be employed not only in an ether recovery system prior to recirculating the ether solvent, but also in the initial treatment of the solvent in order to remove such impurities when the electrolyte is first prepared, that is, when the ether is first used to make a solvent solution of the Grignard reagent.

A more specific object of the invention is to provide a new and improved process for purifying ethers used in electrolytes containing a Grignard reagent made by reacting magnesium and methyl or ethyl chloride in said organic ether solvent.

Yet another object of the invention is to provide a new and improved process for purifying light or relatively low boiling ethers such as tetrahydrofuran which boil at a temperature below about 100° C.

A further object of the invention is to purify both heavy and light ethers, with at least one of each class being used to form a solvent mixture for Grignard reagents in an electrolytic system of preparing alkyl lead compounds.

Yet another specific object of the invention is to purify tetrahydrofuran which will be subsequently used in conjunction with the diethyl ether of tetraethyleneglycol as a preferred solvent mixture for Grignard reagents.

Other objects will appear hereinafter.

In accordance with the invention, it has been found that ethers containing active hydrogen impurities, such as alcohols, can be purified by contacting said ethers with sulfamic acid whereby reaction products of said acid and said impurities are formed. The reaction products are then prepared from the ethers and the purified ethers employed as solvents in an electrolytic system for producing alkyl lead compounds.

The primary source of active hydrogen impurities are lower alcohol impurities. Thus, by treating the impure ethers containing said alcohols with acid, esters are formed which are relatively non-volatile in character. Thus, it is a simple matter to separate out from the nonvolatile reaction products any volatile ether by such means as distillation and the like. The process of the invention is therefore particularly applicable to purifying relatively volatile ethers which have a boiling point lower than 100° C. such as tetrahydrofuran and the like.

The amount of sulfamic acid reagent added, of course, depends upon the content of active hydrogen impurities present in the ethers. This can be determined by a simple test which is actually a modified Zerewitenoff test procedure. Specifically, an aliquot sample of the ether to be purified is measured and the impurity level determined by adding an excess of a Grignard reagent to the test sample. Gas volume evolved is measured to determine the content of active hydrogen impurities present. The Grignard reacts with such materials releasing gas. It has been determined that a 10 ml. sample of impure ether reacted with excess Grignard which gives off 83 cc. gas is approximately ⅓ normal in active hydrogen impurities. The "Activity Number" of such ether material is then designated as 83. An approximate 1 normal solution of alcohol in ether has an Activity Number of about 250. Thus, it is a simple matter to determine the amount of sulfamic acid necessary to effect complete reaction of active hydrogen impurities by first employing the above test to note impurity level. Likewise by measuring activity of ether before and after treatment with sulfamic acid, it is possible to determine the percent reduction of active hydrogen impurities resulting from the treatment.

It is a preferred embodiment of the invention to use a 5–75% excess sulfamic acid in carrying out the purification step.

The invention is particularly adaptable to purification of a solvent system comprising at least one water-miscible ether and more preferably at least two water-miscible ethers, one of which is a relatively volatile material, and the other is a heavy or non-volatile ether. Exemplary water-miscible ethers, volatile in character include tetrahydrofuran and tetrahydrofurfurylethylether. Exemplary water-miscible, non-volatile ethers include the ethers of polyalkylene glycols such as diethyl ethers of diethylene glycol, triethylene glycol, tetraethylene glycol, pentaethyene glycol and mixtures thereof.

Briefly, in recovering a mixture of a non-voatile and volatile ether, each of which are water-miscible in character, the volatile ether such as tetrahydrofuran is steam-stripped from the non-volatile ether, both of which form part of the reaction mass from the electrolysis reaction of alkyl lead compounds. After the initial separation both types of ethers are further purified. It has been discovered that alcohol impurities are carried through with both of the ethers and particularly with the volatile organic ether, and therefore the ethers must be treated via the process of the invention before return to the electrolytic cell.

In a typical separation, the volatile ether after the above separation steps have been effected is contacted with sulfamic acid reagent. The sulfamic acid reagent may be dissolved in the same water-miscible, non-volatile ether such as polyglycol ether which is also used as a solvent for Grignard reagent during the electrolysis step. Again, esters of alcohols contained in the volatile ether are formed. The volatile ether may then be separated by distillation or other suitable techniques from the sulfamic acid-ether impurity reaction products, and subsequently the non-volatile polyglycol ether solvent for the sulfamic acid reagent also separated out.

The above types of separations and purifications are most preferably carried out when the water-miscible, volatile ether is tetrahydrofuran and the water-miscible, non-volatile ether is the diethyl ether of tetraethylene glycol.

The invention will be further illustrated but is not limited thereto by the following example.

EXAMPLE

In this example, a sample of tetrahydrofuran containing substantial amounts of alcohol impurities was purified with sulfamic acid. Specifically, the starting ether sample had an Activity No. of about 180. The ether was contacted with 4.0% sulfamic acid based on ether weight at 60–70° C. The ether was then distilled over, yielding a substantially pure product having an Activity No. of about 5–10. Thus, it is apparent that the method of the invention is extremely efficient in purifying ethers such as tetrahydrofuran containing alcohol impurities.

As is mentioned above, the invention is particularly applicable to purification of water-miscible, volatile ethers which can be easily separated from the reaction products. However, the invention can be practiced in conjunction with any ether containing active hydrogen compounds such as alcohol. In addition to purification of ether materials such as tetrahydrofuran, polyethers of glycols can also be easily purified by contact with sulfamic acid. Representative polyglycol ethers which may be purified have the following general formulae:

(1)             R—O—$R_1$—O—$R_5$
(2)          R—O—$R_1$—O—$R_2$—O—$R_5$
(3)    R—O—$R_1$—O—$R_2$—O—$R_3$—O—$R_5$
(4) R—O—$R_1$—O—$R_2$—O—$R_3$—O—$R_4$—O—$R_5$ where the radicals R and $R_5$ are hydrocarbon radicals of 1–6 carbon atoms and the radicals $R_1$, $R_2$, $R_3$ and $R_4$ are alkylene radicals containing two to six carbon atoms. Thus, one of the radicals R or $R_5$ can be hexyl and the other ethyl; one can be hexyl and the other propyl or isopropyl; both can be ethyl; one can be ethyl and the other methyl; one can be hexyl and the other butyl, secondary butyl, isobutyl or tertiary butyl; one can be hexyl and the other amyl or isoamyl; or both can be phenyl; or one can be benzyl and the other ethyl. The radicals $R_1$, $R_2$, $R_3$ and $R_4$ are preferably ethylene but can be, for example, propylene, butylene, amylene or hexylene. For use in electrolytes of the type previously described, the radicals R and $R_5$ should preferably be such that the polyglycol ethers are liquid at 20° C.

The above-described polyglycol ethers may be either water-miscible or water-immiscible. Generally, preferred materials are non-volatile relative to such light ethers as tetrahydrofuran and the like when a combination of the two classes are employed as solvents in the electrolysis process.

The temperature employed in the treatment may be subject to variation but is preferably within the range of about 20° C. to about 150° C. Again, the time of treatment may be widely varied but is preferably within the range of 10 to 120 minutes. Even a few minutes contact time has an appreciable effect.

The invention is especially useful in purifying an ether solvent employed in solution with a Grignard reagent which is electrolyzed in the presence of a sacrificial lead anode and in which R is methyl and/or ethyl, and X is chlorine. Thus, tetramethyl lead can be made by electrolyzing methyl magnesium chloride in an anhydrous ether solution, using a lead anode, and tetraethyl lead can be made by electrolyzing ethyl magnesium chloride in an anhydrous ether solution, using a lead anode.

The invention is also useful in the manufacture of mixed alkyl lead compounds, such as, triethylmethyl lead, diethyldimethyl lead and ethyltrimethyl lead, usually in the form of mixtures with tetraethyl lead and tetramethyl lead by using as the electrolyte mixtures of methyl magnesium chloride and ethyl magnesium chloride in an ether. Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues. Similarly, the phenyl magnesium chloride, phenyl magnesium bromide or mixtures of phenyl and ethyl magnesium chloride, or mixtures of phenyl and ethyl magnesium bromide, or mixtures of phenyl and methyl magnesium chloride, or mixtures of phenyl and methyl magnesium bromide can be electrolyzed to produce other organic lead compounds containing the phenyl radical or both the phenyl and ethyl radicals, or both the phenyl and methyl radicals, or both the phenyl and other alkyl radicals in case a higher alkyl magnesium halide is substituted for the ethyl magnesium halide or the methyl magnesium halide. In a similar manner benzyl magnesium chloride in an organic ether can be employed as an electrolyte.

The electrolyte can, and preferably does, contain an excess of organic halide over that required to form the Grignard reagent.

The term "Grignard reagent" as used herein refers to the product obtained by reacting approximately equimolar proportions of a compound having the formula RX and Mg according to the equation:

$$RX + Mg \rightarrow RMgX$$

in which R represents the organic radical, X represents the halogen atom of the Grignard reagent, and Mg is the conventional symbol for magnesium. The radical R can be, for example, methyl, ethyl, propyl, isopropyl, butyl and higher homologues, phenyl, benzyl, and the like. The radical X can be, for example, chlorine, bromine or iodine.

The ether to be purified can also contain one or more hydrocarbons such as, for example, toluene, benzene, xylene, and diphenyl. The amounts of these hydrocarbons in the electrolyte solvents usually do not exceed 25% by weight of the total solvent.

In making organic lead compounds by a process of the type described above using at least one ether as a solvent for the Grignard reagent, one method of operation is to treat the spent electrolyte containing organic lead product, water-miscible ether solvents with or without other solvents such as hydrocarbons, excess organic halide and unreacted Grignard reagent, with water whereby the organic lead compound is separated out. The aqueous brine solution containing ethers is then further processed. Generally, the lower boiling ether solvents, such as tetrahydrofuran, are usually separated out by fractional distillation or steam-stripping or by some other suitable procedure. The volatile ethers may be then purified in the process of the invention as outlined above. If another water-miscible ether is present which is relatively non-volatile, this material may be separated from water and brine present by extraction with low-boiling hydrocarbon solvents such as toluene and also treated with Grignard, if necessary.

During this recovery procedure, acids or other neutralizing agents can be added in order to remove unreacted Grignard reagent prior to the waterwash step. Again, excess organic halide can be removed by a conventional gas-stripping apparatus. It is during these procedures, especially during the heating and acidizing step in which active hydrogen impurities are formed due to degradation of the ethers. The present invention makes it possible to overcome this ether degradation as set forth above. In essence, the addition of sulfamic acid to ether can be made at any convenient step in the solvent recovery system.

The instant process has an advantage over that described in copending, commonly-assigned application Ser. No. 476,187, filed July 30, 1965, in that unreacted sulfamic acid is not distilled over with purified ether as a contaminant. Use of sulfuryl dichloride disclosed as a reagent in the above-cited application has this disadvantage, making its use somewhat undesirable, particularly if excessive amounts of sulfuryl dichloride is employed. Also, the sulfamic acid has an additional advantageous property compared to sulfuryl dichloride and similar materials in that it tends to somehow destroy peroxides present in the ethers. These peroxides could be a safety hazard in the solvent recovery system and as well are believed to promote additional impurity formation if carried through with the ether.

The invention is hereby claimed as follows:

1. A process for purifying ethers containing lower alcohols which comprises contacting said ethers with sufficient sulfamic acid whereby reaction products of said acid and said lower alcohols are formed, and separating said ethers from said reaction products.

2. The process of claim 1 wherein said ethers are volatile ethers which are separated from said non-volatile reaction products by distilling off said ethers.

3. The process of claim 2 wherein at least one of said ethers purified has a boiling point less than 100° C.

4. The process of claim 3 wherein said volatile ether is tetrahydrofuran.

5. The process of claim 1 wherein an excess of sulfamic acid is added to said ethers over the theoretical amount necessary to react with substantially all of the lower alcohols present.

6. A process for purifying volatile ethers containing lower alcohols which comprises adding a solution of a water miscible non-volatile polyglycol ether containing sufficient sulfamic acid to completely react with said lower alcohols whereby non-volatile esters of said alcohols are formed and separating out said volatile ether from said non-volatile materials by distillation.

7. The process of claim 6 wherein said solution contains an excess amount of sulfamic acid over that required to theoretically react with all of said lower alcohols present.

8. The process of claim 7 wherein said water-miscible volatile ether is tetrahydrofuran and said water-miscible non-volatile ether is the diethylether of tetraethylene glycol.

9. In the electrolytic manufacture of organic lead compounds wherein an electrolyte comprising a solution of a Grignard reagent in an ether solution is electrolyzed, using a lead anode, and the ether solution is recoverd in a recovery system and recycled for use in the preparation of additional quantities of electrolyte; the improvement which comprises treating said ether solvent containing lower alcohols prior to recycling with sufficient sulfamic acid to react with said lower alcohols whereby reaction products of said acid and said lower alcohols are formed, and separating said ether from said reaction products.

References Cited

UNITED STATES PATENTS 3,164,537    1/1965    Linsk et al. _____ 204—59
3,356,738    12/1967    Hauser et al. _____ 260—615

HOWARD S. WILLIAMS, *Primary Examiner.*

U.S. Cl. X.R.

260—456, 615